UNITED STATES PATENT OFFICE.

WILHELM BORCHERS, OF AACHEN, GERMANY, AND HARALD PEDERSEN, OF TRONDHJEM, NORWAY.

PROCESS FOR THE EXTRACTION OF COPPER AND NICKEL, PARTICULARLY FROM LOW-GRADE ORES AND PRODUCTS.

1,043,291.

Specification of Letters Patent.   Patented Nov. 5, 1912.

No Drawing.   Application filed February 6, 1912.   Serial No. 675,831.

*To all whom it may concern:*

Be it known that we, WILHELM BORCHERS, professor, a subject of the German Emperor, and resident of 15 Ludwigsallee, Aachen, Germany, and HARALD PEDERSEN, engineer, a subject of the King of Norway, and resident of Trondhjem, Norway, have invented certain new and useful Improvements in Processes for the Extraction of Copper and Nickel, particularly from low-grade ore and products; and we do hereby declare the following to be a full, clear, and exact description of the invention, such as will enable others skilled in the art to which it appertains to make and use the same.

The processes heretofore known for the treatment of nickel ores containing copper aim either to concentrate the ores by a rather complicated system of matte smelting combined with wet lixiviation and precipitating processes, or to roast the ore so that chiefly its copper and cobalt contents are turned into sulfates and leached from the residue containing the nickel, which may then be reduced like a pure nickel ore. The latter process may be suitable for ores containing paying amounts of cobalt besides copper and nickel, but it has not given much satisfaction with ores from which copper alone has to be separated from nickel. A complete recovery and a perfect separation of the two metals especially when low grade ores are to be treated, was heretofore one of the most troublesome metallurgical problems, until the inventors of the present process concluded to altogether abandon the working principles just referred to in favor of the following idea.

According to this invention no separation of copper and nickel should be attempted during the first stages of treating the ore consisting of matte smelting, roasting and leaching and the difficulty of extracting the nickel down to the last traces from the roasted matte should be overcome by using the residue from leaching the roasted matte as a flux in the first stage of the process: *i. e.*, in the matte smelting. These principles combined will allow an almost complete recovery of both metals copper and nickel.

The whole process will be fully understood by the following explanations of the single stages:

First. The ore is smelted preferably in an electric furnace. Unless the gangue of the ore is readily fusible, a flux must be added, the nature of which is determined by the nature of the gangue. As in most cases the gangue consists of silicates containing much silica, a basic flux like limestone will be advisable. This flux should be added in small quantities, in order to leave the amount of silica high enough to form a slag of the chemical character of approximately a bisilicate. Thus in the smelting operation a crude matte containing practically all the nickel and copper and a large part of the iron and sulfur is obtained along with an acid slag almost free from copper and nickel. This slag may be granulated by a current of water, to facilitate its use as a component of mortar, or it may be poured into molds, to produce bricks, paving stones, drainage pipes and other building stone ware.

Second. The crude matte is roasted in such a manner that not only the copper but also the nickel is for the greater part converted into sulfates, but the iron into the oxid. This result is obtained by keeping the temperature of roasting in the vicinity of 600° C.

Third. The copper and nickel sulfates obtained from the first or roasting operation are dissolved by leaching with acidulated water obtained from percolation towers through which the waste gases from the roasting furnaces flow in a counter stream toward the percolating water and therefore containing sulfurous and sulfuric acids.

Fourth. The residue from this leaching operation, consisting principally of iron oxid, but also containing an amount of imperfectly roasted or overroasted and therefore insoluble copper and nickel compounds, is added as a flux in the smelting operation first described. The insoluble copper and nickel is therefore reconverted into crude matte while the iron oxid owing to the oxidation of iron sulfid according to the equation:

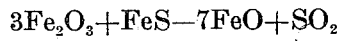
$$3Fe_2O_3 + FeS = 7FeO + SO_2$$

favors the oxidation of iron sulfids to ferrous oxid which enters into the slag thus leaving a matte richer in copper and nickel.

Fifth. By adding sulfid of calcium or sulfid of sodium to the acid solution obtained by the third operation copper is precipitated as a sulfid. After separating the latter by filtration the nickel is precipitated from the filtered solution by adding more sulfid of calcium or sulfid of sodium. This is also to be separated from the solution by filtration. The reactions involved in the foregoing are indicated in the following equations:

$$Na_2S + H_2SO_4 = Na_2SO_4 + H_2S$$

$$H_2S + CuSO_4 = CuS + H_2SO_4$$

$$Na_2S + CuSO_4 = CuS + Na_2SO_4$$

$$Na_2S + NiSO_4 = NiS + Na_2SO_4$$

Sixth. The sulfids thus obtained are each (separately of course) reduced to copper and nickel by smelting with a flux of limestone and a carbonaceous reducing agent such as coal, coke or charcoal, preferably in an electric furnace, calcium sulfid being obtained as a slag.

Seventh. Since by the use of calcium sulfid as precipitating agent for copper and nickel from the sulfate lyes too much gypsum is carried into the copper and nickel sulfid deposit, the calcium sulfid obtained from the sixth operation is turned into sulfid of sodium by treating it, if necessary under pressure, with suitable sodium compounds, for example sodium sulfate in aqueous solutions. The sodium sulfid solution thus obtained may be used to better advantage as precipitating agent in the fifth operation. Sodium sulfate solution is obtained hereby which may again be regenerated to sodium sulfid solution by means of calcium sulfid.

The following table will give a still better view on the whole process:

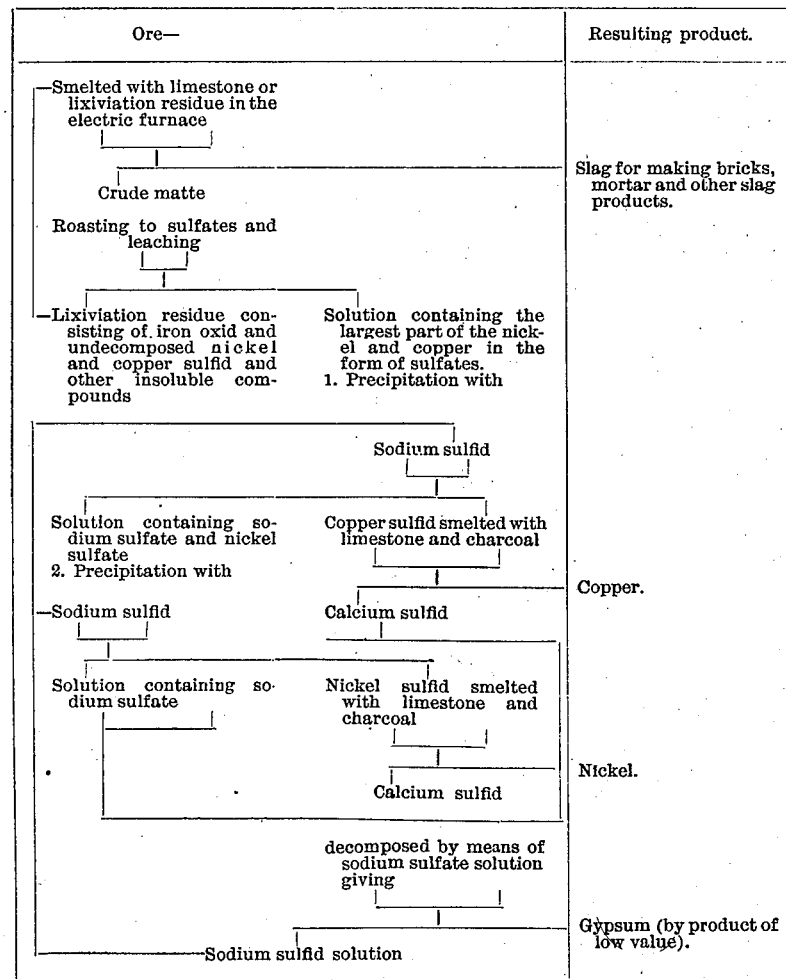

None of the separate stages of which the process is made up is novel when considered alone. The smelting of a sulfid ore to obtain crude matte the roasting of the matte to form sulfates, the lixiviation of the products of roasting, the gradual precipitation of first the copper and then the nickel from the solution, the electric smelting of nickel sulfid with limestone and charcoal to obtain metallic nickel, are all processes well known in electric-metallurgy. Similarly the substitution of calcium sulfid by sodium sulfid in the precipitation to prevent the depositing of gypsum is not novel *per se*. It was not previously known however that from nickel ores poor in copper there could be extracted both these metals mentioned almost without any loss by smelting the ore to obtain a nickel copper matte, roasting the matte to sulfate, lixiviating the product of roasting, gradual precipitation by means of soluble sulfids and separate smelting of the sulfids. And this surprising result is obtained in spite of all the imperfections of the roasting and lixiviating processes by using the roasting and leached matte now chiefly consisting of iron oxid as flux in the first stage of smelting the ore to a nickel copper matte.

The following explanations should be noted. It is known that no roasting and lixiviating process in one operation will give a satisfactory output of the metal to be recovered. In the present process we obtain only 80 to 90% in the form of sulfate of the copper and nickel contained in the matte. The remaining 10 to 20% remain in the residue. The lixiviation residues could be subjected to a subsequent roasting and lixiviation as is done in the Ziervogel process at Mansfeld to extract the last traces of silver, but this would entail a considerable addition to the working costs. Owing however to the step of adding this residue to the ore to be smelted in the first stage an appreciable diminution of the working costs is obtained which is explained as follows: The $Fe_2O_3$ of the roasted and leached residue oxidizes the sulfids of the ore according to the equation

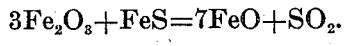

The first consequence of this reaction is that a larger amount of iron is converted into slag so that a matte richer in nickel and copper is obtained. Furthermore the addition of the roasted and leached residue to the ore charge introduces heat generating reactions into the smelting process. This will be seen from the formula and from the fact of the neutralizing action between FeO and $SiO_2$, namely the conversion to slag of the FeO with the silica of the acid gangue. This is confirmed by the fact that in the smelting tests carried out by the inventors, less power was used when lye residues were added to the ore than when the ore alone was smelted, the quantity of ore treated being the same in both cases. The fluidity of the slag is increased by the inexpensive flux added. That part of the copper and nickel contents of the ore which cannot be recovered by one roasting and one leaching operation is converted into crude matte and thus assists in rendering this latter richer in the above metals. In the smelting test very pure slags containing mostly less than 0.1% of nickel and copper were melted.

What we claim is:—

1. An improved process for the extraction of nickel and copper from ores or byproducts containing the sulfids of these metals and of iron, consisting in the combination of the following operations: smelting the ore to a matte and a slag almost free from copper and nickel, roasting the matte at a temperature of about 600° C., leaching the sulfates by means of acidulated water, returning the residues from this leaching process to the first stage of matte smelting, precipitating from the sulfates solution first the copper and then separately the nickel by means of alkaline sulfids, reducing each of the precipitated, filtered and dried sulfids of copper and of nickel separately by smelting with alkaline earth flux and carbonaceous agents, thus obtaining pure copper and pure nickel and a slag consisting chiefly of calcium sulfid, and utilizing the latter preferably after its conversion into sulfid of sodium as a precipitating agent for the copper and nickel sulfate solutions.

2. The process for extracting nickel and copper from ores and the like containing sulfids, which comprises smelting the ore to a matte and a slag almost free from said metals, roasting the matte at a temperature of approximately 600° C., leaching the roasted material with acidulated water, precipitating from the sulfate solution first the copper and then the nickel by means of alkaline sulfids, and smelting the resulting sulfids of copper and nickel separately with a suitable flux.

In testimony whereof we affix our signatures in presence of two witnesses.

WILHELM BORCHERS.
HARALD PEDERSEN.

Witnesses:
 HENRY CUADJUEY,
 MATHIEU GILLES.